(12) United States Patent
Moore

(10) Patent No.: US 9,110,960 B2
(45) Date of Patent: Aug. 18, 2015

(54) DATA STAGING

(75) Inventor: Devin C. Moore, Lewis Center, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 702 days.

(21) Appl. No.: 12/759,119

(22) Filed: Apr. 13, 2010

(65) Prior Publication Data

US 2011/0251998 A1    Oct. 13, 2011

(51) Int. Cl.
*G06F 17/30* (2006.01)
*G06F 3/06* (2006.01)

(52) U.S. Cl.
CPC .......... *G06F 17/3056* (2013.01); *G06F 3/0646* (2013.01)

(58) Field of Classification Search
None
See application file for complete search history.

(56) References Cited

U.S. PATENT DOCUMENTS

| | | | | |
|---|---|---|---|---|
| 2003/0191701 A1* | 10/2003 | Haseltine et al. | | 705/34 |
| 2008/0140692 A1* | 6/2008 | Gehring | | 707/101 |
| 2009/0313260 A1* | 12/2009 | Mimatsu | | 707/10 |
| 2010/0138339 A1* | 6/2010 | Adelson et al. | | 705/39 |
| 2010/0280990 A1* | 11/2010 | Castellanos et al. | | 707/602 |

OTHER PUBLICATIONS http://www.faqs.org/rfcs/rfc821.html (entitled "RFC821—Simple Mail Transfer Protocol," by Jonathan B. Postel, dated Aug. 1982) 46 pages.

* cited by examiner

*Primary Examiner* — Miranda Huang

(57) ABSTRACT

A set of inbound data is received in a computer. At least one attribute of the inbound data is determined. The inbound data is parsed. A set of staging records is generated in the computer that include at least some of the inbound data in one or more fields included in each of the staging records. It is determined that at least some of the staging records are ready for migration to a target environment. The staging records are migrated to the target environment in the computer.

20 Claims, 3 Drawing Sheets

DATA STAGING

BACKGROUND INFORMATION

Applications such as reporting applications, payment processing applications, finance applications, order fulfillment applications, etc, may receive data from one or more external sources. Receiving data from an external source is sometimes referred to as receiving a data feed. Once a data feed has been received, data may be loaded into a target environment, e.g., into a relational database, for use by an application. Sometimes the target environment is what is referred to as a production environment, i.e., a version of the application and data accessed by users. Present mechanisms for analyzing, validating, and loading data into a target environment may be limited.

DETAILED DESCRIPTION OF PREFERRED EMBODIMENTS

Figure 1:
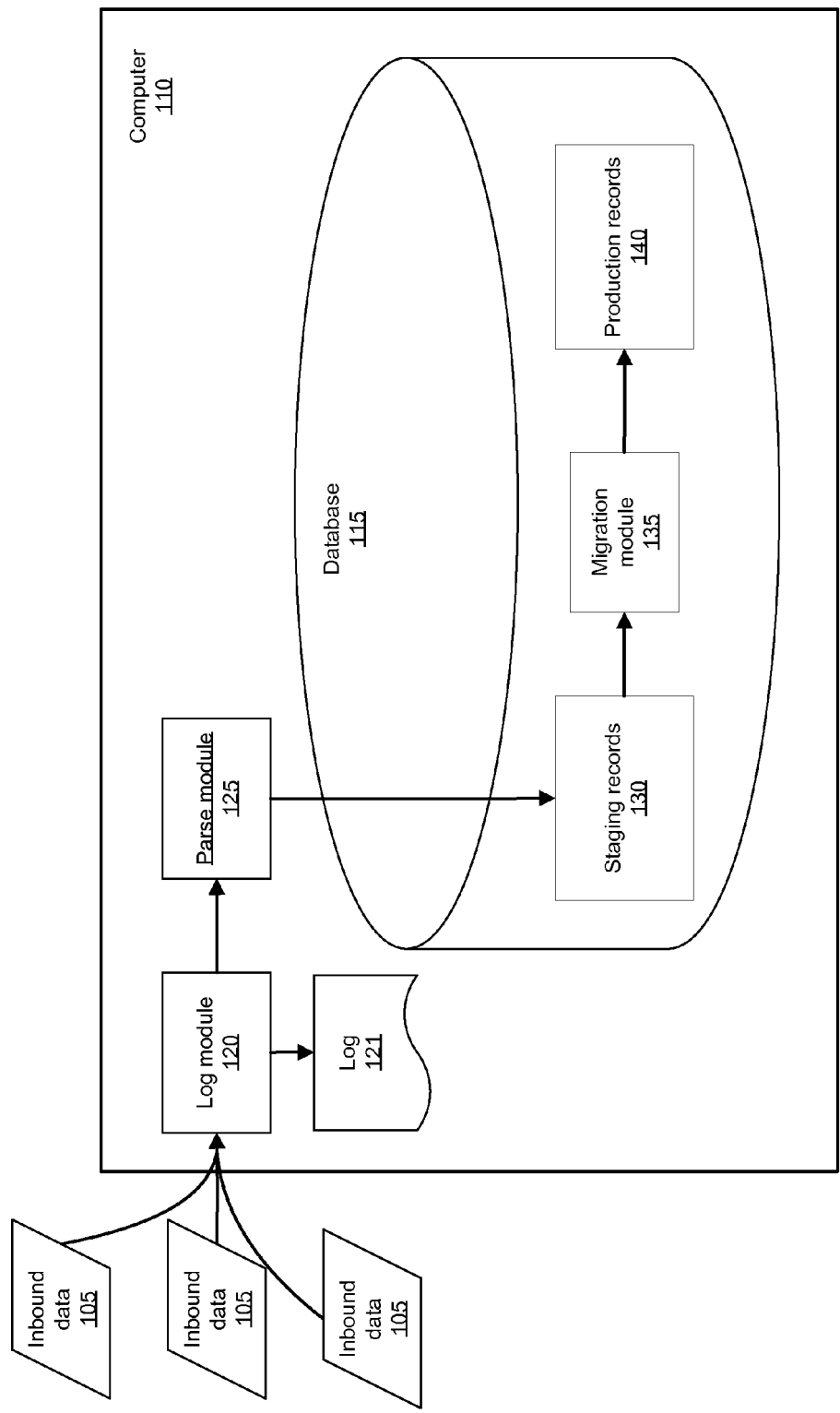
FIG. 1 illustrates an exemplary system for receiving and providing application data.

FIG. 1 illustrates an exemplary system 100 for receiving and providing application data. As illustrated in FIG. 1, one or more sets of inbound data 105 are received in a computer 110. Inbound data 105 may be received in computer 110 in a variety of manners. For example, inbound data 105 could be received via a computer network such as a local area network, the Internet, etc. Inbound data 105 could be received as an attachment to an electronic mail (e-mail) message, the attachment being possibly in one or more formats such as a word processing document, a spreadsheet file, a text file, etc.

The inbound data 105 are generally intended to be stored in a database 115 that is included within the computer 110. Alternatively, although not shown in FIG. 1, database 115 could be included in a computing device to separate from computer 110, and could be communicatively coupled to computer 110, e.g., through a local area network, wide area network, or the like.

A log module 120 may be included within the computer 110 and configured to analyze certain attributes of inbound data 105, and to log the arrival of inbound data 105 in computer 110, along with certain attributes of the inbound data 105. Thus, log module 120 may generate or populate a log 121 with information relating to the receipt of one or more sets of inbound data 105. For example, with respect to a set of inbound data 105, the log 121 may include information such as a timestamp relating to the receipt of a set of inbound data 105, any error messages associated with the receipt of the data 105, a file size associated with the data 105, a file type associated with the inbound data, etc.

A parse module 125 may also be included in computer 110 and configured to parse sets of inbound data 105 so that the inbound data 105 may be properly loaded into one or more tables in database 115. Parse module 125 may also be configured to detect when inbound data 105 is in an incorrect or unrecognized format.

Database 115 may include staging records 130, a migration module 135, and production records 140. As discussed below, database 115 may include one or more tables that store data in a relational format. Accordingly, staging records 130 may be stored in one or more tables in database 115, such as tables 205 discussed below with respect to FIG. 2. Such tables are generally populated with data included in staging records 130 with inbound data 105 that has been processed by log module 120 and parse module 125. Notably, database 115 generally includes a first set of tables for staging records 130 and a second set of tables for production records 140. Thus, rather than writing inbound data 105 directly to production records 140, inbound data 105 may first be loaded into staging records 130.

Placing staging records 130 and production records 140 in a single database 115 provides the advantage of eliminating security concerns that might arise in placing inbound data 105 in a test environment rather that in a production environment for staging and evaluation. Often, test environments do not enjoy security protections, or the robustness, of production environments. Further, including staging records 130 and production records 140 in a single database 115 often provides the advantage that, when data is migrated from staging records 130 to production records 140, an application using production records 140 can continue to operate, be accessed by users, etc. At the same time, allowing staging records 130 to be in separate tables from production records 140 provides the advantage of allowing records 130 to be tested an evaluated before being provided for use by an application in a target, e.g., production environment.

Migration module 135 may include one or more routines stored in database 115, e.g., stored procedures, scripts, etc., that are configured to move data from staging records 130 to a target environment, e.g., to production records 140, under certain circumstances, e.g., a predefined trigger event, certain conditions being satisfied with respect to staging records 130, etc. Inbound data 105 is generally staged in staging records 130 for as least the purposes of ensuring data 105 is sufficiently complete and accurate to be migrated to production records 140.

Production records 140 may be used to support one or more applications included in computer 110. For example, applications in computer 110 could include reporting applications, finance applications, payment processing applications, order fulfillment applications, etc. Production records 140 may be stored in one or more tables in database 115, such as tables 305 discussed below with respect to FIG. 3.

Figure 2:
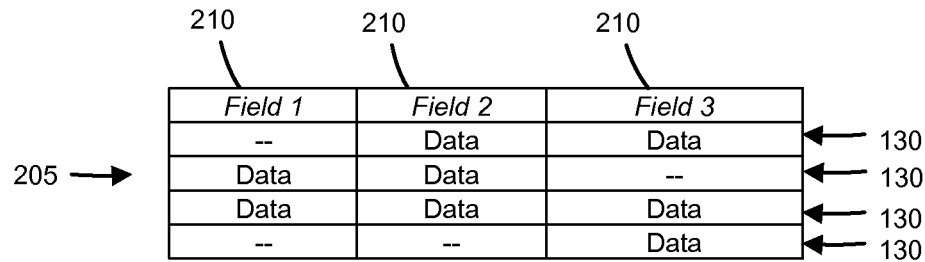
FIG. 2 illustrates an exemplary staging table including staging records.

FIG. 2 illustrates an exemplary staging table 205 including staging records 130. Staging table 205 is generally a table in relational format, including a plurality of fields 210. For example, FIG. 2 shows three fields 210 in the table 205, although the table 205 could include two fields 210, or many more. Likewise, FIG. 2 shows the table 205 including four records 130, although the table 205 could include any number of, i.e. one or more, records 130, so long as such number of records 130 could be accommodated by database 115.

As seen in FIG. 2, not all fields 210 in each record 130 are populated with data. That is, referring to the intersection of a record 130 and a field 210 as a "cell," some cells contain data, as indicated by the notation "Data," whereas other cells do not, as indicated by the dashes depicted in those cells. A record 130 is considered complete, and ready for migration to a target environment, e.g., production records 140, when all cells in the record 130 include data, and the data in all cells in the record has been validated. Sometimes, more than one set of inbound data 105 is needed to completely populate a record 130, i.e., to provide valid data for all cells in the record 130.

Accordingly, a record 130 in the table 205 may be partially populated with a first set of inbound data 105, and then completed with data included in one or more second sets of inbound data 105.

Although a single table 205 is illustrated in FIG. 2 for convenience, a single record 130 could include fields 210 in two or more tables 205. For example, a first set of inbound data 105 could be used to populate a first table 205. A second set of inbound data 105 could be used to populate a second table 205. Together, respective rows of data in the first and second tables 205 could make up records 130. Moreover, it is possible that a first set of inbound data 105 could be used to populate multiple tables 205, but records 130 including fields in two or more multiple tables 205 may not be complete until certain fields 210 in the multiple tables 205 are populated with at least one second set of inbound data 105. Thus, even if a source of inbound data 105 has represented that records 130 are complete, they may in fact be incomplete.

In addition to being configured to analyze records 130 for completeness, database 115 may be configured to perform other validations. For example, certain fields may be checked for a size of data, or for a type of data (e.g., alphanumeric, binary, etc.). Further, database 130 may implement rules that allow a first record 130 to be migrated to production records 140 only when one or more second records 130 are complete. For example, the first and second records 130 may have a child-parent relationship, and database 115 may implement a rule that prohibits a parent record 130 from being migrated before a child record is complete. Similarly, database 115 may implement a rule that prohibits a child record 130 from being migrated before a parent record is complete, thereby precluding production records 140 from including "orphan" records 140, i.e., records 140 that will not be recognized by an application because the application requires a parent record 140 in order to recognize its child record(s) 140.

Migration module 135 may be configured to migrate production records 140 to staging records 130, in addition to, or in lieu of, being configured to migrate staging records 130 to production records 140. For example, execution of an application, perhaps due to input from a user changing a data field, may result in production data 140 becoming corrupted or incorrect. A validation process in database 115 could detect such incorrectness or corruption, whereupon migration module 135 could be configured to migrate the incorrect or corrupted production record 140 to staging records 130, and/or to raise an alert.

Figure 3:
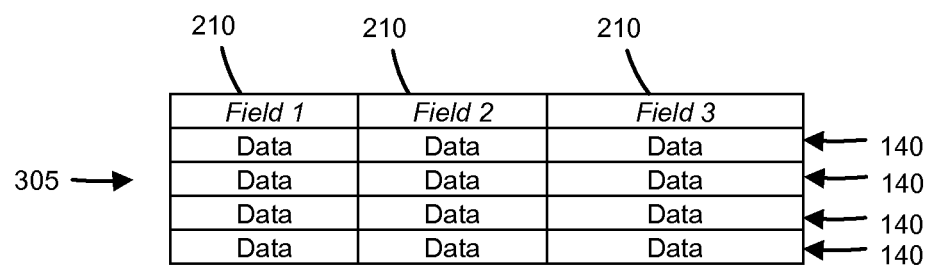
FIG. 3 illustrates an exemplary production table including production records.

FIG. 3 illustrates an exemplary production table 305 including production records 140. As mentioned above, production records 140 are generally populated from staging records 130 by migration module 135 once staging records 130 are complete and validated. Therefore, every cell in production table 305 includes the notation "Data," indicating that the cell is populated with data. Note, however, that it is possible that a record 140 could be considered complete where a cell was intentionally void of data, in which case the notation "Data" would nonetheless be applicable to indicate that the record 140 was complete.

Although a single table 305 is illustrated in FIG. 3 for convenience, a single record 140 could include fields 210 in two or more tables 305. In any event, once one or more tables 305 are populated with data, database 115 may be used to provide data for one or more applications included in computer 110, as mentioned above.

Figure 4:
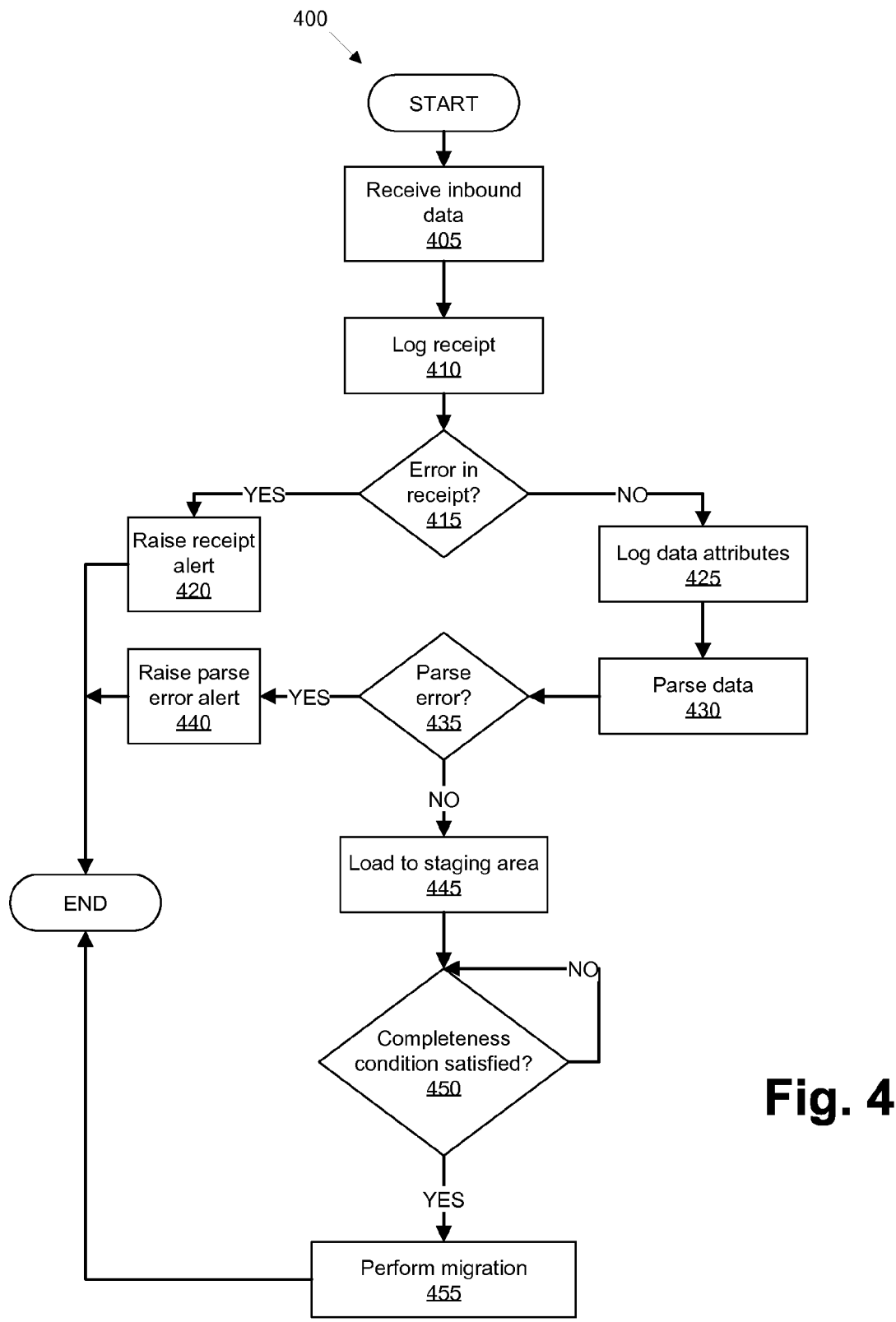
FIG. 4 illustrates an exemplary process for processing inbound data.

FIG. 4 illustrates an exemplary process 400 for processing inbound data 105. Process 400 begins in a step 405, in which inbound data 105 is received in computer 110. For example, as mentioned above, inbound data 105 may be received as an attachment to an e-mail message. Log module 120 may configured to recognize receipt of inbound data 105, e.g., receipt of an e-mail message, analyze the inbound data 105 to provide certain information to log file 121, and generally also to determine whether the process 400 may continue.

Accordingly, next, in step 410, information relating to the receipt of data 105 is written to log file 121. For example, as noted above, log module 120 generally associates a timestamp or some other identifying information with a received set of inbound data 105. Log module 120 then generally writes the timestamp to log file 121, along with a notation that inbound data 105 has been received, any error conditions, and possibly other metadata, such as a filename.

Next, in step 415, log module 120 determines whether any errors have been detected in the receipt of inbound data 105. For example, an e-mail including inbound data 105 as an attachment could have a "delayed" error condition, etc. associated with it. For example, error conditions that may arise with e-mails are discussed in Jonathan B. Postel, RFC821-Simple Mail Transfer Protocol (August 1982), found on the Internet at http://www.faqs.org/rfcs/rfc821.html. If an error condition is detected in the receipt of inbound data 105, step 420 is executed next. Otherwise, step 425 is executed next.

In step 420, log module 120 notes an error condition, e.g., in the form of an error code or some other notation, writes the error condition to log file 121, and raises a receipt alert. A receipt alert may be an e-mail alert to an administrator, or some other message, or may simply be a notation in log file 121, concerning the error condition detected as described above with respect to step 415. Generally, a receipt alert should be affirmatively provided to an administrator or the like in the form of an e-mail, text message, etc., so that action may be taken to address the error condition that has been detected. Following step 420, process 400 ends.

In step 425, which may follow step 415, log module 120 writes attributes of the received data 105 to log file 121. For example, such attributes may include file size, file type, format of file, etc. Other attributes may be logged, although as additional attributes are included in a log file 121 the speed and performance of log module 120 may be diminished.

Next, in step 430, parse module 125 parses the data 105 received in step 405. For example, if the data 105 is of an expected format, e.g., based on a filename or extension thereto, or based on other information received with the data 105, e.g., a subject line or content of an e-mail to which the data 105 was attached, then parse module 125 may proceed to parse the data 105 according to the expected format. Further, parse module 125 may analyze the data 105 to determine an appropriate format to be parsed. For example, parse module 125 may examine a file to determine whether the data 105 in the file is in American Standard Code for Information Interchange (ASCII) format, and if it is, parse module 125 may then attempt to determine how fields in the ASCII file are delimited, e.g., by spaces, tabs, commas, etc. Parse module 125 may be configured to detect other standard formats as well. If no errors are detected, parse module 125 parses data 105 into staging records 130, including fields 210 within records 130, such as described above.

Next, in step 435, parse module 125 determines whether any errors were encountered in parsing the received data 105. If no errors were detected, step 445 is executed next. However, if errors were detected, step 440 is executed next.

In step 440, parse module 125 raises a parse error alert, e.g., notes an error condition and sends a message to an administrator and/or makes a notation, e.g. in log file 121, relating to the error condition. Following step 440, process 400 ends.

In step 445, which may follow step 435, parse module 125 loads parsed data 105 into staging records 130. As noted above, staging records 130 may be included in one or more tables 205.

Next, in step 450, migration module 135 analyzes staging records 130 to determine whether the records 130 are ready for migration to production records 140. Various standards may be implemented for determining when records 130 are ready for migration. For example, migration module 135 may be configured to migrate a staging record 130 to production records 140 when migration module 135 determines that all fields 210 in a record 130 are appropriately populated, i.e., complete. However, migration module 135 may alternatively or additionally be configured to migrate a staging record 130 to production records 140 only one all records 130 in a specified table 205 or a specified set of tables 205 are appropriately populated, i.e., complete. That is, some applications using data 105 may allow data 105 to be updated in production records 140 on a piecemeal basis, whereas other applications may require production records 140 to be updated on a wholesale basis, i.e., with a specified set of data 105 e.g., a certain number of records 130 may be required to be completed, records 130 including certain predetermined identifiers may be required, etc.

As noted above, a record 130 is deemed ready for migration to production records 140 once it has passed all required validations. For example, validations may include the length of data in a field, the content of a data field, as well as more complex multi-field, multi-table validations, e.g., showing that various elements are both present and within ranges. Data whitelists may be used for certain fields to prevent any data except data certain white-listed values or ranges, e.g., numeric ranges, alphanumeric ranges, etc., from being migrated to production records 140, and/or data blacklists may be used specifically to prevent certain values from being passed for migration to production records 140. Further, some records 130 may expire or be flagged based on a validation rule that reads a time-of-entry timestamps associated with the record 130, and determines that the record is to be expired because a predetermined amount of time has passed since the time indicated by the timestamp.

In any event, process 400 may remain in step 450 until a completeness condition is satisfied. Once a completeness condition is satisfied, migration module 135, in step 455, may migrate records 130 to records 140. Following step 455, process 400 may end.

Computing devices such as computer 110 may employ any of a number of computer operating systems, including, but by no means limited to, versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines (IBM) of Armonk, N.Y., and the Linux operating system. In one implementation, computer 110 is a mainframe computer sold by IBM, and uses IBM's z/OS operating system. Computing devices in general may include any one of a number of computing devices, including, without limitation, a computer workstation, a desktop, notebook, laptop, or handheld computer, or some other computing device.

Computing devices such as computer 110, IPG server 130, etc., generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language mentioned above. Database 115 may be any of a variety of known RDBMS packages, including IBMS DB2, or the RDBMS provided by Oracle Corporation of Redwood Shores, Calif.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
receiving, in a computer, a first set of inbound data;
populating a first staging record and a second staging record in a test environment of the computer with at least some of the first set of inbound data in one or more fields included in each of the first and second staging records;
determining that:
the first staging record is ready for migration to a target environment by determining that the one or more fields in the first staging record is validly populated;
that the second staging record is not ready for migration;
migrating the first staging record determined to be ready for migration to the target environment to create a first production record in the computer;
after migrating the first staging record, waiting to receive, in the computer, a second set of inbound data;
supplementing the second staging record determined to be not ready for migration with at least some of the second set of inbound data received in the computer; and
migrating the second staging record to the target environment to create a second production record, wherein migrating the second staging record occurs when each of the one or more fields of the second staging record is validly populated.

2. The method of claim 1, further comprising determining that a staging record is to be deleted because a predetermined amount of time has elapsed since inbound data included in the staging record was received in the computer.

3. The method of claim 1, wherein determining that the first staging record is ready for migration to the target environment includes determining that a related staging record is ready for migration to the target environment.

4. The method of claim 1, further comprising:
determining a file size attribute of the first set of inbound data; and
writing the file size attribute of the first set of inbound data to a log file.

5. The method of claim 1, further comprising:
detecting corruption of a production record in the target environment; and
migrating the production record having corruption from the target environment to the test environment.

6. A system, comprising:
a computing device including a non-transitory computer-readable medium embodying computer-executable instructions, wherein the computing device is configured to:
receive a first set of inbound data;
populate a first staging and a second staging record in a test environment of the computer with at least some of the first set of inbound data in one or more fields included in each of the staging records;
determine that the first staging record is ready for migration to a target environment by determining that the one or more fields in the first staging record is validly populated;
determine that the second staging record is not ready for migration;
migrate the first staging record determined to be ready for migration to the target environment in the computer to create a first production record;
after the migration of the first staging record, wait to receive, in the computer, a second set of inbound data;
supplement the second staging record determined to be not ready for migration with at least some of the second set of inbound data received in the computer; and
migrate the second staging record to the target environment to create a second production record when each of the one or more fields of the second staging record is validly populated.

7. The system of claim 6, the computing device further configured to determine that a staging record in the test environment is to be deleted because a predetermined amount of time has elapsed since inbound data included in the staging record was received in the computer.

8. The system of claim 6, the computing device further configured to determine that a particular staging record is ready for migration to the target environment based at least in part on whether a related staging record is ready for migration to the target environment.

9. The system of claim 6, the computing device further configured to:
determine a file size attribute and a file format attribute of the first set of inbound data; and
write the file size attribute and the file format attribute of the first set of inbound data to a log file.

10. The system of claim 6, the computing device further configured to: detect an error related to a production record in the target environment; and
migrate the production record to the test environment to recreate a staging record.

11. A non-transitory computer-readable medium tangibly embodying computer-executable instructions, when executed by one or more processors of a computer, cause the performance of:
receiving, using a processor of a computer, a first set of inbound data;
populating a first staging record and a second staging record in a test environment of the computer with at least some of the first set of inbound data in one or more fields included in each of the first and second staging records;
determining that:
the first staging record is ready for migration to a target environment by determining that the one or more fields in the first staging record is validly populated;
that the second staging record is not ready for migration;
migrating the first staging record determined to be ready for migration to the target environment to create a first production record in the computer;
after migrating the first staging record, waiting to receive, in the computer, a second set of inbound data;
supplementing the second staging record determined to be not ready for migration with at least some of the second set of inbound data received in the computer; and
migrating the second staging record to the target environment to create a second production record, wherein migrating the second staging record occurs when each of the one or more fields of the second staging record is validly populated.

12. The medium of claim 11, the instructions further including instructions for determining that a staging record is to be deleted because a predetermined amount of time has elapsed since inbound data included in the staging record was received in the computer.

13. The medium of claim 11, wherein receiving the first set of inbound data comprises receiving the first set of inbound data in an e-mail attachment.

14. The medium of claim 11, the instructions further including instructions for:
   determining a file size attribute of the inbound data; and
   writing the file size attribute of the inbound data to a log file.

15. The medium of claim 11, the instructions further including instructions for detecting corruption in a production record in the target environment, and migrating the corrupted production record in the target environment to the test environment.

16. The method of claim 1, wherein determining that the one or more fields in the first staging record is validly populated comprises determining that the inbound data in each field has passed a set of validations.

17. The method of claim 16, wherein the set of validation includes determining that data in at least one field of the one or more fields is within at least one of a numeric range and an alphanumeric range.

18. The method of claim 1, wherein populating the staging records comprises parsing the first set of inbound data to populate the at least some of the first set of inbound data in the one or more fields.

19. The method of claim 3, further comprising prohibiting the migration of the first staging record until the related staging record is validly populated.

20. The method of claim 3, further comprising:
   determining that the first staging record is required for the related staging record to be recognized in the target environment; and
   prohibiting the migration of the related staging record until the first staging record is validly populated.

\* \* \* \* \*